(12) United States Patent
Onorato et al.

(10) Patent No.: US 10,470,451 B2
(45) Date of Patent: Nov. 12, 2019

(54) OUTRIGGER CLAMP

(71) Applicant: GEM Products, Inc., Orange Park, FL (US)

(72) Inventors: Matthew Stewart Onorato, Jacksonville, FL (US); Jason Sarnowski, Jacksonville, FL (US); Erle Matthew Bridgewater, Ponte Vedra, FL (US)

(73) Assignee: GEM Products, Inc., Jacksonville, FL (US)

( * ) Notice: Subject to any disclaimer, the term of this patent is extended or adjusted under 35 U.S.C. 154(b) by 304 days.

(21) Appl. No.: 14/863,964

(22) Filed: Sep. 24, 2015

(65) Prior Publication Data
US 2017/0086442 A1 Mar. 30, 2017

(51) Int. Cl.
A01K 91/08 (2006.01)
A01K 87/04 (2006.01)
A01K 87/02 (2006.01)
A01K 97/10 (2006.01)
A01K 91/18 (2006.01)
A01K 99/00 (2006.01)
F16B 7/14 (2006.01)
B63B 17/00 (2006.01)
B63B 35/14 (2006.01)

(52) U.S. Cl.
CPC ............. A01K 97/10 (2013.01); A01K 87/02 (2013.01); A01K 87/025 (2013.01); A01K 87/04 (2013.01); A01K 91/08 (2013.01); A01K 91/18 (2013.01); A01K 99/00 (2013.01); B63B 17/00 (2013.01); B63B 35/14 (2013.01); F16B 7/14 (2013.01)

(58) Field of Classification Search
CPC ........ A01K 87/04; A01K 91/08; A01K 87/02; A01K 87/025; B63B 17/00; B63B 35/14
USPC ............. 43/24, 18.1 CT, 27.4; 114/255, 364; 403/292, 293, 296, 301, 300, 305, 403/309–311, 313
See application file for complete search history.

(56) References Cited

U.S. PATENT DOCUMENTS 104,884 A * 6/1870 Reinshagen ............ F16B 7/182
403/286
173,534 A * 2/1876 Endicott ................ A01K 87/00
43/25
(Continued)

FOREIGN PATENT DOCUMENTS

EP 0345401 A1 * 12/1989 ............. A01K 87/04
FR 2696900 A1 * 4/1994 ........... A01K 87/005
(Continued)

OTHER PUBLICATIONS

Translation of JP08-51895.*
(Continued)

Primary Examiner — Darren W Ark
(74) Attorney, Agent, or Firm — Seyfarth Shaw LLP

(57) ABSTRACT

An outrigger clamp to couple together two or more nestable tubes. The clamp can include a guide for retaining filament. The guide can rotate about an axis based on the forces applied to the outrigger to better align the filament and guides, and therefore align the forces applied to the outrigger and filament. The retainer can be, for example, one or more rollers that help prevent the filament from becoming creased or kinked during use.

37 Claims, 5 Drawing Sheets

(56) References Cited

U.S. PATENT DOCUMENTS

| | | | | |
|---|---|---|---|---|
| 252,008 A * | 1/1882 | Andrews | A01K 87/02 | 43/18.1 CT |
| 475,024 A * | 5/1892 | Thurston | B23B 31/202 | 43/18.1 R |
| 742,490 A * | 10/1903 | Pray | B63H 16/06 | 43/24 |
| 1,463,084 A * | 7/1923 | McCormack | A01K 87/02 | 43/18.1 R |
| 1,970,624 A * | 8/1934 | Recker | F21V 21/22 | 248/337 |
| 2,452,788 A * | 11/1948 | Peters | A01K 87/025 | 43/17 |
| 2,578,663 A * | 12/1951 | Beaupre | A01K 87/025 | 43/18.1 R |
| 2,652,654 A * | 9/1953 | Bahn | A01K 87/04 | 125/11.15 |
| 3,063,668 A * | 11/1962 | Yohe | A01K 91/08 | 248/538 |
| 3,103,375 A * | 9/1963 | McMullin | E04H 12/182 | 248/188.5 |
| 3,122,383 A * | 2/1964 | Hirsch | F16L 37/1235 | 285/397 |
| 3,380,097 A * | 4/1968 | Pharris | B05C 17/0205 | 15/145 |
| 3,447,254 A * | 6/1969 | Sobel | A01K 87/025 | 43/18.1 HR |
| 3,588,154 A * | 6/1971 | Voight et al. | F16D 1/04 | 403/300 |
| 3,891,294 A * | 6/1975 | Philibert | H02G 3/0683 | 174/663 |
| 3,968,587 A * | 7/1976 | Kammeraad | A01K 91/08 | 242/397.1 |
| 4,217,061 A * | 8/1980 | Eiland | F16D 1/04 | 403/313 |
| 4,428,697 A * | 1/1984 | Ruland | F16D 1/0864 | 403/290 |
| 4,928,420 A * | 5/1990 | Jackson | A01K 91/08 | 43/27.4 |
| 4,993,346 A * | 2/1991 | Rupp | A01K 91/08 | 114/255 |
| 5,037,235 A * | 8/1991 | Aquilina | B25G 1/04 | 16/427 |
| 5,193,932 A * | 3/1993 | Wu | E04C 5/165 | 403/307 |
| 5,295,408 A * | 3/1994 | Nagle | F16C 1/105 | 74/501.5 R |
| 5,458,305 A * | 10/1995 | Woodward | A61M 5/1415 | 248/121 |
| 5,598,743 A * | 2/1997 | Yasuda | F16C 1/14 | 403/11 |
| 5,622,443 A * | 4/1997 | Lampert | A63B 21/0552 | 403/291 |
| 5,921,196 A * | 7/1999 | Slatter | A01K 91/08 | 114/255 |
| 5,924,235 A * | 7/1999 | McCulley | A01K 87/02 | 403/334 |
| 5,974,722 A * | 11/1999 | Kiser | A01K 97/01 | 43/18.1 CT |
| 5,992,804 A * | 11/1999 | Johnson | B63B 29/06 | 114/363 |
| 6,123,035 A * | 9/2000 | Pfister | A47B 87/0223 | 108/147.13 |
| 6,637,363 B2 * | 10/2003 | Schmitt | B63B 19/02 | 114/343 |
| 6,908,249 B2 * | 6/2005 | Tomm | B25G 1/04 | 403/109.1 |
| 7,025,015 B2 * | 4/2006 | Wilcox | A01K 91/08 | 114/255 |
| 7,111,574 B2 * | 9/2006 | Slatter | A01K 91/08 | 114/255 |
| 7,461,476 B1 * | 12/2008 | Davis | A01K 87/002 | 43/18.1 CT |
| 7,814,812 B1 * | 10/2010 | Ziegahn | B62K 21/26 | 16/421 |
| 7,913,442 B2 * | 3/2011 | Roth | A01K 87/04 | 43/24 |
| 8,347,546 B2 * | 1/2013 | Rupp | A01K 87/025 | 248/255 |
| 8,422,716 B2 * | 4/2013 | Wetzel | F16B 7/14 | 248/337 |
| 8,656,632 B1 * | 2/2014 | Mercier | A01K 91/08 | 114/255 |
| 8,683,735 B1 * | 4/2014 | Figari | A01K 91/08 | 43/18.1 CT |
| 9,504,239 B2 * | 11/2016 | Stender | A01K 87/025 | |
| 10,337,547 B2 * | 7/2019 | Onorato | A01K 91/08 | |
| 2002/0172548 A1 * | 11/2002 | Chang | B25G 3/22 | 403/305 |
| 2004/0016385 A1 * | 1/2004 | Wilcox | A01K 91/08 | 114/255 |
| 2006/0231009 A1 * | 10/2006 | Slatter | A01K 91/08 | 114/255 |
| 2015/0323050 A1 * | 11/2015 | Ohno | F16H 25/20 | 74/434 |
| 2016/0001851 A1 * | 1/2016 | Kardas | B63B 17/04 | 114/364 |
| 2017/0071178 A1 * | 3/2017 | Serocki | A01K 91/08 | |
| 2018/0014522 A1 * | 1/2018 | Bridgewater | A01K 97/10 | |

FOREIGN PATENT DOCUMENTS

| | | | | |
|---|---|---|---|---|
| GB | 684671 A | * | 12/1952 | ........... A01K 87/025 |
| JP | 08051895 A | * | 2/1996 | |
| JP | 2001057829 A | * | 3/2001 | |
| JP | 2001069879 A | * | 3/2001 | |
| JP | 2006191833 A | * | 7/2006 | |

OTHER PUBLICATIONS

Translation of FR2696900.*
Taco Marine Sport Fishing—Product Specification for Carbon Fiber Center Rigger Pole (p. 1) and Carbon Fiber Tele-Outrigger Pole (p. 2).†

* cited by examiner
† cited by third party

OUTRIGGER CLAMP

TECHNICAL FIELD OF THE INVENTION

The present invention relates generally to clamps. More particularly, the present invention relates to an outrigger clamp with a filament guide that rotates about an axis of the clamp.

BACKGROUND OF THE INVENTION

Outriggers are popular in fishing applications. Outriggers are rigid poles that are a part of the boats rigging and are designed to extend the fishing pole bait lines beyond the "white wash" of the water surrounding the boat. This is preferable because bait traveling through clear water is more likely to successfully attract a fish. Once a fish takes the bait, the line is automatically released from the outrigger and all forces are transferred directly to a fishing pole secured to the gunnel of the boat. For example, the bait line can be connected to a quick release mechanism that releases the line and transfers the forces to the pole when a fish engages the bait or otherwise pulls on the line.

Outriggers typically include several tubes connected to one another by clamps. The clamps can secure the tubes together when the outrigger is arranged in the extended position to prevent the tubes from collapsing upon one another. Also, the clamps can be engaged when arranged in a collapsed position to prevent the tubes from extending.

Outriggers typically include clamps with guides that retain a filament. The filament can pass through the guides and connect to the quick release mechanism to extend the bait line a desired distance from the boat when the outrigger is in the extended position. The guides are preferably oriented parallel to one another. In doing so, the force applied to the filament by the bait line is coplanar with the axis of the clamp at a point furthermost from the boat, allowing a more structurally stable configuration.

Current outrigger models require manual manipulation to retain the position of the clamp guides. For example, before engaging the clamps, a user must use their hands to rotate the tubes to properly align the guides of each clamp. In addition, conventional outrigger clamps and guides do not prevent the filament from becoming tangled, requiring the filament to be released and either untangled or replaced.

SUMMARY OF THE INVENTION

The present invention broadly comprises an outrigger clamp capable of securing two or more nestable tubes. The clamp includes a guide with a retainer that retains a filament of the outrigger. The guide can rotate about an axis of the outrigger based on the forces applied to the filament without affecting the connection between the nestable tubes. The clamp can also include a retainer, for example, rollers, that retain the filament in a manner to prevent creases and kinks in the filament. The outrigger clamp can adequately align the guides holding the filament without extensive manual manipulation, and help prevent the filament from becoming creased or kinked during use.

In an embodiment, the present invention broadly includes a clamp including a body having opposing first and second ends, a first clamping mechanism disposed at a first end and adapted to receive a first work piece, and a cap coupled to the body at the second end to form a second clamping mechanism adapted to receive a second work piece and couple the second work piece to the first work piece. A guide is disposed between the cap and the body and is adapted to rotate about an axis of the body. Further, the clamp includes a split ring having opposing first and second chamfers and a split ring gap extending axially along a periphery of the split ring, the first chamfer engaging the cap and reducing the size of the gap as the cap is coupled to the body.

In another embodiment, the present invention broadly includes a clamp including a body having opposing first and second ends, with a first clamping mechanism disposed at a first end and adapted to receive a first work piece. A cap is coupled to the body at the second end to form a second clamping mechanism adapted to receive a second work piece and couple the second work piece to the first work piece. A guide is disposed between the cap and the body and is adapted to rotate about an axis of the body. The first clamping mechanism applies a first compressive force to the first work piece along a radial direction of the body, and the second clamping mechanism applies an axial compressive force to the first work piece along an axial direction of the cap.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
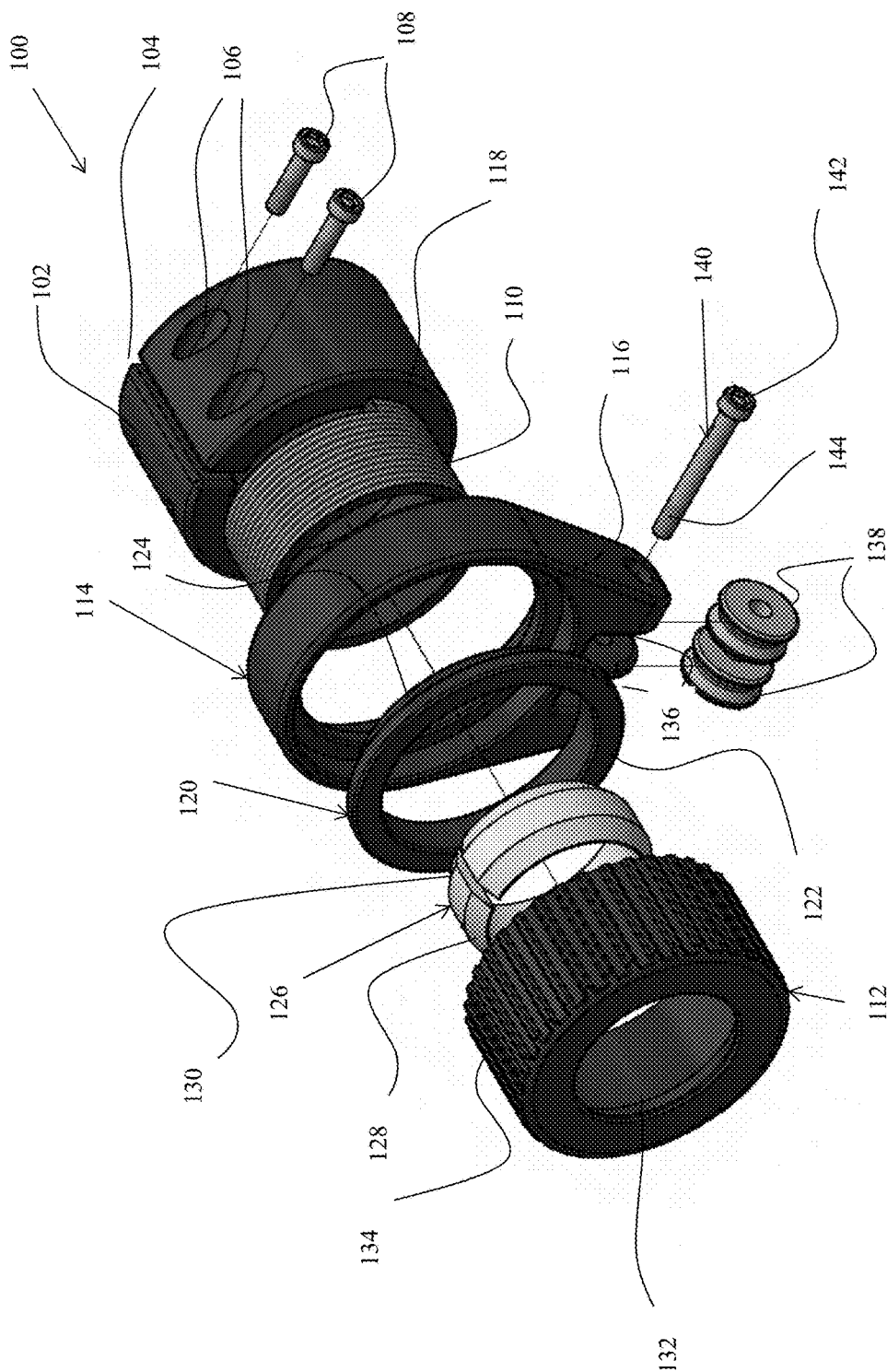
FIG. 1 is a top, perspective, exploded view of a clamp according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises an outrigger clamp that couples together a pair of nestable tubes. The clamp can include a guide for filament that connects to a quick release mechanism. The guide can rotate about an axis of the outrigger when forces are applied to the filament and, in doing so, rotate to align the filament. Aligning of the filament helps prevent tangling of the filament and fishing line and directs forces on the outrigger in a structurally stable manner, without affecting the connection between the nestable tubes. The clamp can also include a retainer that retains the filament without causing the filament to crease or kink.

Referring to FIGS. 1-5, a clamp 100 can include a body 102 having a gap 104 to allow the body to flex in a radial direction when receiving a nestable tube. For example, the body 102 can receive the larger of two nestable tubes and the larger tube can press the body 102 outwardly in a radial direction. The body 102 can, therefore, compress the larger nestable tube and secure the tube in position. For example, the body 102 can include holes 106 for receiving fasteners 108, such as bolts or screws, to couple the larger nestable tube within the body 102. The fasteners 108 can connect to internal threads within the body 102 and close the gap 104 when further inserted into the body 102. Typically, a user would not adjust the body 102 during use of the clamp 100, but would use a different mechanism to couple the clamp 100 in the extended or collapsed positions. However, the present invention is not limited to such a method, and a user can adjust the body 102 freely during use if so desired.

The body 102 can be coupled to a threaded portion 110 that, in turn, is threadably coupled to a cap 112. For example, the user can rotate the cap along the threads of the threaded portion 110 and couple the smaller nestable tube to the larger nestable tube already secured within the body 102. In this manner, the combination of the body 102, gap 104, holes 106, and fasteners 108 is one example of a first clamping mechanism that applies a radial compressive force, as discussed herein. However, other structures can be implemented as the first clamping mechanism without departing from the spirit and scope of the present invention.

A guide 114 can be positioned on the body 102 and rotatable about an axis of the clamp 100. For example, the guide 114 can include an inner ring 116 having a first side facing the body 102 and a second side opposite the first side. The first side can abut an outer face 118 of the body 102 and freely rotate about the axis of the clamp 100. As discussed below, this free rotation of the guide 114 allows the outrigger and filament to align themselves during use. Forces on the bait line, outrigger, and filament can therefore be aligned with one another and allow for a more structurally stable configuration. Also, a user need not manually adjust the guide 114 because the force of the filament will automatically cause the guide 114 to align properly.

A lock ring 120 can be positioned adjacent the guide 114 in the axial direction of the clamp 100. The lock ring 120 can be fixed to the body 102 by, for example, threads, to prevent the guide 114 from moving in the axial direction of the clamp 100. The lock ring 120 can include a flange 122 extending around a periphery of the lock ring 120, and a base 124 extending in the axial direction with an outer diameter less than the outer diameter of the flange 122. The flange 122 may abut against the second side of the guide 114 when the clamp 100 is assembled to substantially prevent axial movement, but allow rotational movement, of the guide 114.

The lock ring 120 may include or couple with a friction member that presses against the guide 114 to prevent rotation of the guide 114 due to the force of gravity. For example, the friction member can supply enough frictional resistance to substantially prevent the guide 114 from rotating about the body 102 due to gravity, but allow the guide 114 to rotate about the body 102 when a more sufficient external force is applied. The frictional member can therefore allow forces on the outrigger and bait line to align the guides 114 of the outrigger, without necessarily allowing movement of the guides 114 due to gravity.

A split ring 126 can be disposed proximate the threaded portion 110, for example, in a chamfer located in the threaded portion 110, as discussed below. The split ring 126 can include opposing first 128 and second chamfers 130.

The split ring 126 can be discontinuous and includes a gap extending both through the split ring and axially with respect to the split ring 126 to allow for flexing of the split ring 126, similar to the body 102 and gap 104 discussed above. The split ring 126 can flex and apply a compressive force against the smaller of two nestable tubes of the outrigger. For example, the internal diameter of the split ring 126 can compress the outside periphery of the smaller of the two nestable tubes when the cap 112 is rotated to be inserted on the threaded portion 110. In particular, the cap 112 can push against the first chamfer 128, causing the second chamfer 130 to push against the threaded portion 110, and thereby close the gap in the split ring 126. By closing the gap in the split ring 126, the diameter of the split ring 126 decreases and causes a compressive force to be applied to the smaller of the two nestable tubes, and the smaller tube can be coupled to the larger tube, already positioned within the first clamping mechanism. In this manner, the combination of the cap 112 and split ring 126 is one example of a second clamping mechanism that provides an axial compressive force, as described in this application. However, other clamping mechanisms can be implemented as the second clamping mechanism without departing from the spirit and scope of the present invention.

The cap 112 can include an opening 132 defined on an axial-most end of the clamp 100, and can further include grips 134 for a user to grip to tighten the clamp 100. The opening 132 can be any size that allows the smaller of the two nestable tubes to extend axially outward from the clamp 100 through the opening 132. As shown, the grips 134 are a series of ribs to allow easy rotation of the clamp 100; however, any structure can be implemented as the grips 134 without departing from the spirit and scope of the present application.

The guide 114 can include one or more receiving areas 136 to receive a retainer 138. The receiving areas 136 and/or the retainer 138 can receive and retain a filament of the outrigger and align the filament and other clamps 100 along the outrigger axis. For example, the retainer 138 can be one or more rollers that allow the filament to move axially along the roller. Because the roller is round, the filament can gently engage the guide 114 without creasing or crimping, compared to a more rigid hook or fish eye fastener. As shown, two retainers 138 are disposed in respective receiving areas 136. However, more or fewer retainers 138 and receiving areas 136 can be implemented without departing from the spirit and scope of the present application. For example, the number of retainers can be dependent on the size of the nestable tubes coupled together by the clamp 100. In some embodiments, the larger the tubes, the more retainers 138 disposed on the guide 114.

As shown, the retainers 138 can be coupled to the guide 114 by a shaft 140 having a head 142 and a threaded end 144. The head 142 can be rotatable by a tool, for example an Allen wrench, socket wrench, or screwdriver, and can insert into the guide 114. For example, the threaded end 144 of the shaft 140 can insert into internal threads of the guide 114, or can extend through the guide 114 and couple to a nut at the opposite end of the guide 114.

Figure 2:
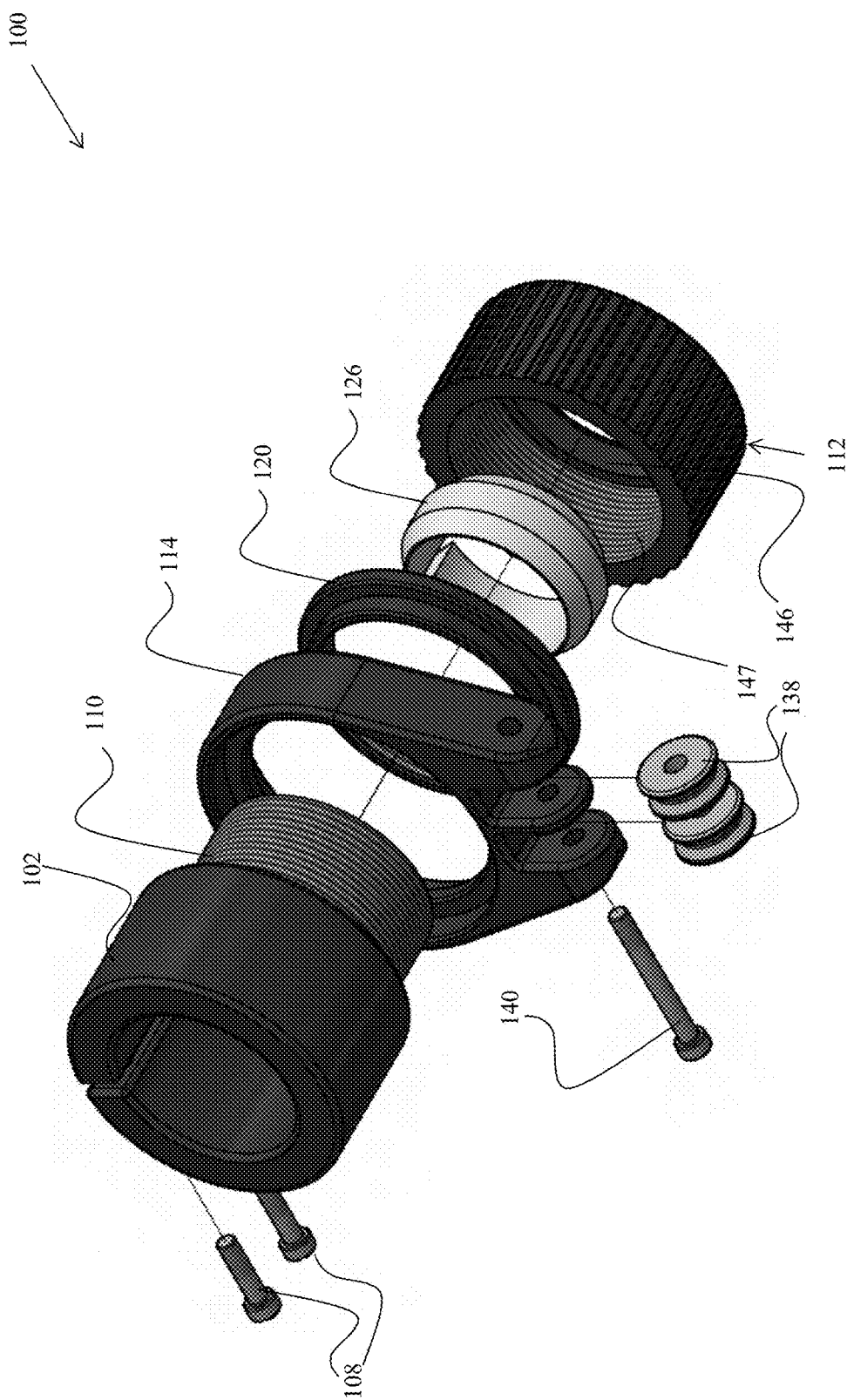
FIG. 2 is a bottom, perspective, exploded view of a clamp according to an embodiment of the present invention.
Figure 3:
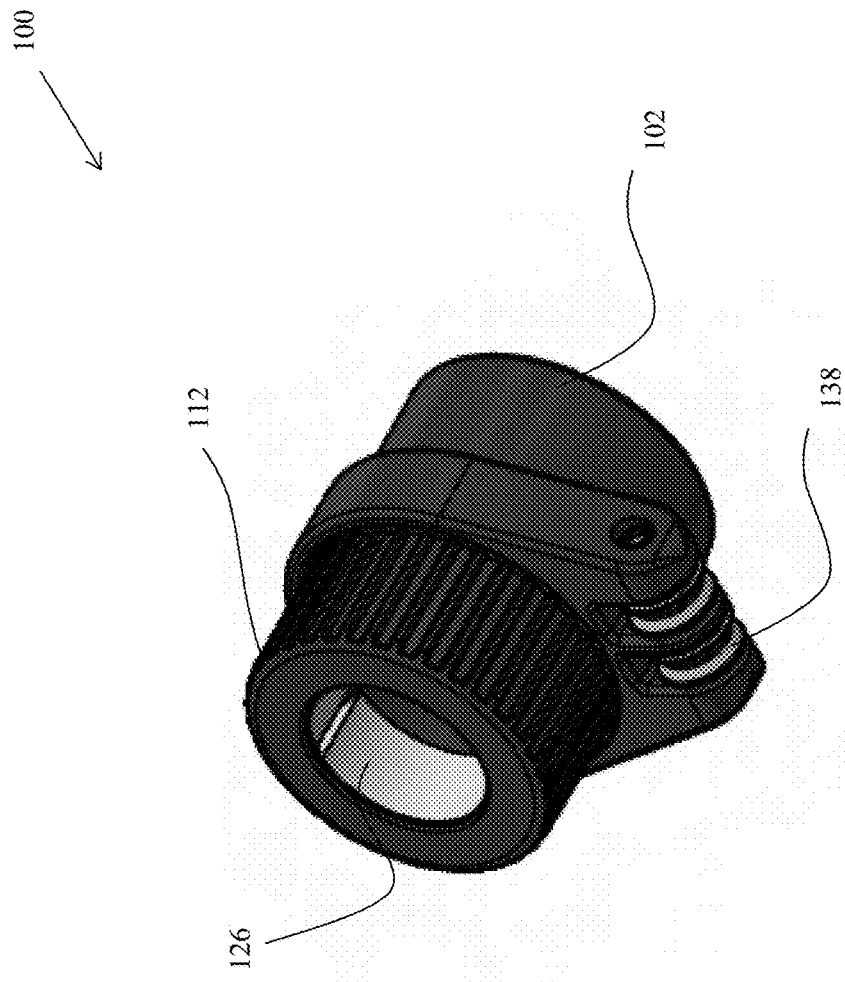
FIG. 3 is a bottom, perspective, assembled view of a clamp according to an embodiment of the present invention.
Figure 4:
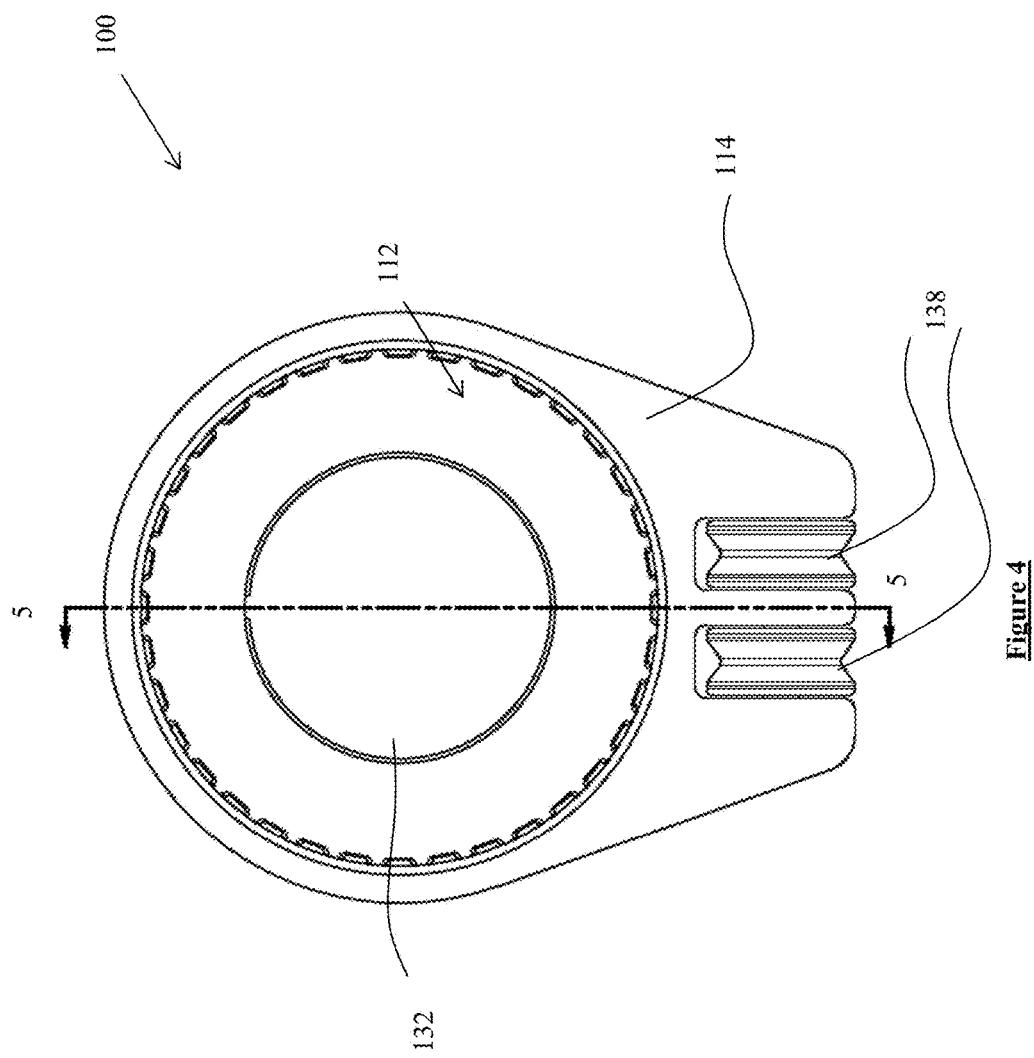
FIG. 4 is a front elevation view of a clamp according to an embodiment of the present invention.
Figure 5:
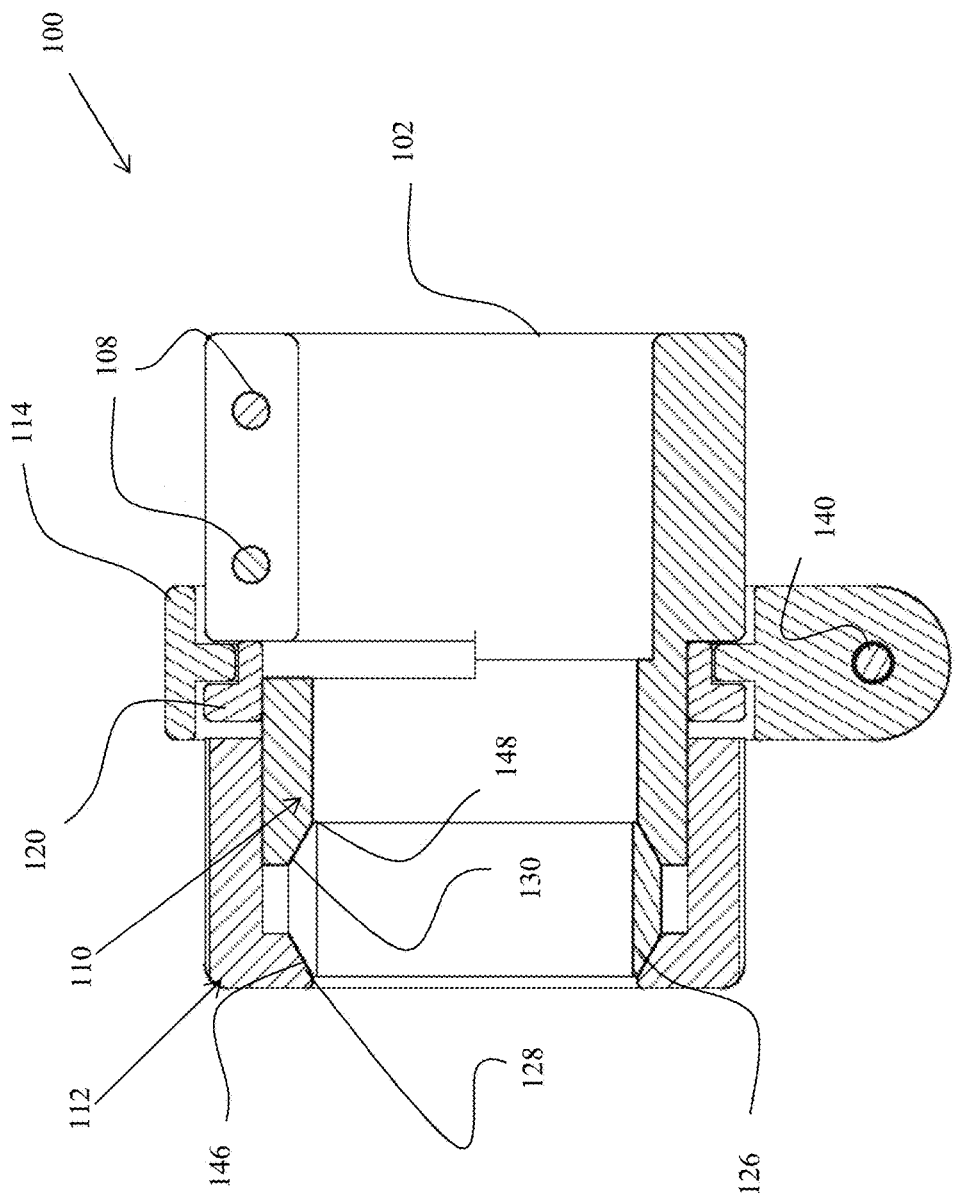
FIG. 5 is a sectional view of the clamp of FIG. 4, taken along line 5-5 of FIG. 4.

FIG. 2 illustrates a cap chamfer 146 and internal threads 147 of the cap 112. Further, FIG. 5 illustrates a threaded portion chamfer 148. As shown, the split ring 126 can be compressed by rotating the cap 112 to insert the cap 112 onto the threaded portion 110. When the cap 112 is inserted onto the threaded portion 110, the cap chamfer 146 pushes against the first chamfer 128 of the split ring 126, and the threaded portion chamfer 148 pushes against the second chamfer 130 of the split ring 126. The compressive forces from the cap chamfer 146 and threaded portion chamfer 148 cause the split ring 126 to close upon its gap, thus decreasing in diameter and applying a compressive force from the inner portion of the split ring 126 to the outer periphery of the smaller nestable tube. The compressive force from the split ring 126 therefore couples the smaller nestable tube with the larger nestable tube, already coupled within the first clamping mechanism.

As discussed herein, the present invention can be utilized with an outrigger, for example, coupling a first nestable tube to a second nestable tube. However, any two work pieces can be coupled together with the present invention, and not necessarily two nestable tubes or two other outrigger portions. Further, the present invention contemplates that the receiving areas 136 and/or retainers 138 can receive a filament. However, any type of line, such as a fishing line, filament, string, rope, or other object, can be received and retained without departing from the spirit and scope of the present invention.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A clamp adapted to clamp first and second work pieces comprising:
    a body having opposing first and second ends and a first clamping mechanism disposed at the first end and adapted to receive the first work piece;
    a second clamping mechanism adapted to receive the second work piece and couple the second work piece to the first work piece, the second clamping mechanism including:
        a cap coupled to the second end; and
        a split ring having a gap extending through the split ring and axially aligned with the split ring, wherein the split ring is adapted to engage the cap and wherein a size of the gap is reduced when the cap is coupled to the second end;
    a lock ring disposed between the cap and the first end of the body; and
    a guide disposed between the cap and the first end of the body and extending around at least a portion of the lock ring, wherein the guide is adapted to rotate about an axis of the body when the first and second clamping mechanisms couple the first and second work pieces together,
    wherein the first clamping mechanism applies a first compressive force to the first work piece along a radial direction of the body, and the second clamping mechanism applies an axial compressive force to the second work piece along an axial direction of the cap.

2. The clamp of claim 1, wherein the lock ring includes an outwardly extending flange adapted to substantially prevent axial movement of the guide.

3. The clamp of claim 2, wherein the lock ring frictionally engages the guide to resist rotation of the guide due to gravity.

4. The clamp of claim 1, wherein the second end includes a threaded portion threadably coupling with the cap.

5. The clamp of claim 4, wherein the split ring includes first and second opposing chamfers, the cap includes a cap chamfer adapted to engage the first chamfer, and the threaded portion includes a threaded portion chamfer adapted to engage the second chamfer.

6. The clamp of claim 1, further comprising retainers coupled to the guide and adapted to retain a line.

7. The clamp of claim 6, wherein the line is a filament.

8. The clamp of claim 6, wherein the retainers are rollers.

9. The clamp of claim 1, wherein the body includes a body gap, and the first clamping mechanism includes a fastener adapted to close the body gap when inserted into the body.

10. The clamp of claim 1, wherein the first and second work pieces are nestable tubes.

11. A clamp adapted to clamp first and second work pieces comprising:
    a body having opposing first and second ends and a first clamping mechanism disposed at the first end and adapted to receive the first work piece;
    a second clamping mechanism disposed at the second end and adapted to receive the second work piece, the second clamping mechanism including:
        a cap coupled to the second end; and
        a split ring having a gap extending through the split ring and being axially aligned relative to the split ring, wherein the split ring engages the cap and wherein a size of the gap is reduced when the cap is coupled to the second end;
    a lock ring disposed between the cap and the first end of the body;
    a guide disposed between the first and second clamping mechanisms and extending around at least a portion of the lock ring, wherein the guide is adapted to rotate about an axis of the body when the first and second clamping mechanisms couple the first and second work pieces together; and
    a retainer coupled to the guide and adapted to retain a line.

12. The clamp of claim 11, wherein the second end includes a threaded portion adapted to threadably couple with the cap.

13. The clamp of claim 12, wherein the split ring includes opposing first and second chamfers, wherein the first chamfer engages the cap and the size of the gap is reduced when the cap is coupled to the second end.

14. The clamp of claim 13, wherein the cap includes a cap chamfer adapted to engage the first chamfer, and the threaded portion includes a threaded portion chamfer adapted to engage the second chamfer.

15. The clamp of claim 11, wherein the lock ring includes an outwardly extending flange adapted to substantially prevent axial movement of the guide.

16. The clamp of claim 15, wherein the lock ring frictionally engages the guide to resist rotation of the guide due to gravity.

17. The clamp of claim 11, wherein the retainer is a roller.

18. The clamp of claim 11, wherein the body includes a body gap, and the first clamping mechanism includes a fastener adapted to close the body gap when inserted into the body.

19. The clamp of claim 11, wherein the first and second work pieces are nestable tubes.

20. A clamp for clamping first and second work pieces, comprising:
a body having opposing first and second ends and a body gap at the first end and a first clamping mechanism disposed at the first end and that is adapted to receive the first work piece, the first clamping mechanism includes a fastener adapted to close the body gap when inserted into the body;
a second clamping mechanism disposed at the second end and that is adapted to receive the second work piece, wherein the second clamping mechanism includes a split ring having a gap extending both through the split ring and axially with respect to the split ring;
a lock ring disposed between the cap and the first end of the body;
a guide disposed between the first and second clamping mechanisms and extending around at least a portion of the lock ring, wherein the guide is adapted to rotate about an axis of the body when the first and second clamping mechanisms couple the first and second work pieces together; and
a retainer coupled to the guide and adapted to retain a line.

21. The clamp of claim 20, wherein the second clamping mechanism includes a cap coupled to the second end.

22. The clamp of claim 21, wherein the second end includes a threaded portion adapted to threadably couple with the cap.

23. The clamp of claim 22, wherein the split ring includes opposing first and second chamfers, and the first chamfer engages the cap and reduces a size of the gap when the cap is coupled to the second end.

24. The clamp of claim 23, wherein the cap includes a cap chamfer adapted to engage the first chamfer, and the threaded portion includes a threaded portion chamfer adapted to engage the second chamfer.

25. The clamp of claim 21, wherein the lock ring includes an outwardly extending flange adapted to substantially prevent axial movement of the guide.

26. The clamp of claim 25, wherein the lock ring frictionally engages the guide to resist rotation of the guide due to gravity.

27. The clamp of claim 20, wherein the retainer is a roller.

28. The clamp of claim 20, wherein the first and second work pieces are nestable tubes.

29. A clamp for clamping first and second work pieces, comprising:
a body having opposing first and second ends and a body gap at the first end and a first clamping mechanism disposed at the first end and adapted to receive the first work piece, the first clamping mechanism includes a fastener adapted to close the body gap when inserted into the body;
a second clamping mechanism including a cap coupled to the second end, and adapted to receive the second work piece and couple the second work piece to the first work piece, wherein the second clamping mechanism includes a split ring having a gap extending both through the split ring and axially with respect to the split ring;
a lock ring disposed between the cap and the first end of the body; and
a guide disposed between the cap and the first end of the body and extending around at least a portion of the lock ring, wherein the guide is adapted to rotate about an axis of the body when the first and second clamping mechanisms couple the first and second work pieces together,
wherein the first clamping mechanism applies a first compressive force to the first work piece along a radial direction of the body, and the second clamping mechanism applies an axial compressive force to the second work piece along an axial direction of the cap.

30. The clamp of claim 29, wherein the lock ring includes an outwardly extending flange adapted to substantially prevent axial movement of the guide.

31. The clamp of claim 30, wherein the lock ring frictionally engages the guide to resist rotation of the guide due to gravity.

32. The clamp of claim 29, wherein the second end includes a threaded portion adapted to threadably couple with the cap.

33. The clamp of claim 32, wherein the split ring includes first and second opposing chamfers, wherein the cap includes a cap chamfer adapted to engage the first chamfer, and the threaded portion includes a threaded portion chamfer adapted to engage the second chamfer.

34. The clamp of claim 29, wherein the first and second work pieces are nestable tubes.

35. The clamp of claim 29, further comprising retainers coupled to the guide and adapted to retain a line.

36. The clamp of claim 35, wherein the line is a filament.

37. The clamp of claim 35, wherein the retainers are rollers.

* * * * *